United States Patent [19]

Granfors et al.

[11] Patent Number: 5,574,764
[45] Date of Patent: Nov. 12, 1996

[54] DIGITAL BRIGHTNESS DETECTOR

[75] Inventors: Paul R. Granfors; Jean C. Morvan, both of Milwaukee; Michael A. Juhl, Pewaukee, all of Wis.

[73] Assignee: General Electric Company, Milwaukee, Wis.

[21] Appl. No.: 466,646

[22] Filed: Jun. 6, 1995

[51] Int. Cl.$^6$ .................................................. H05G 1/64
[52] U.S. Cl. ........................................ 378/98.7; 378/98.8
[58] Field of Search ........................ 378/98.7, 98.8, 378/98.2, 95, 108, 109, 110, 111, 112

[56] References Cited

U.S. PATENT DOCUMENTS

| | | |
|---|---|---|
| 4,742,230 | 5/1988 | Kiri ................................. 378/98.7 X |
| 4,868,651 | 9/1989 | Chou et al. ............................. 378/98.7 |
| 4,905,265 | 2/1990 | Cox et al. ............................... 378/98.8 |
| 5,194,736 | 3/1993 | Meulenbrugge et al. ......... 378/98.7 X |
| 5,485,501 | 1/1996 | Aichinger ............................... 378/98.7 |

*Primary Examiner*—David P. Porta
*Attorney, Agent, or Firm*—B. Joan Haushalter; John H. Pilarski

[57] ABSTRACT

A brightness detector is used to control the x-ray exposure and the displayed image level in a diagnostic x-ray imaging system. Initially, a region of interest of an image is specified. The average pixel value within the specified region of interest of the image is then found, ignoring regions below a preselected low signal level threshold. Finally, the average pixel value is fed back to the x-ray generator to control the x-ray exposure. The average pixel value is also used to determine a scaling factor to be applied to the image in order to maintain an optimum brightness level when the desired x-ray exposure cannot be attained.

10 Claims, 4 Drawing Sheets

☒ = PIXEL ENABLED

▓ = PIXEL ENABLED

DIGITAL BRIGHTNESS DETECTOR

TECHNICAL FIELD

The present invention relates to x-ray diagnostic imaging and, more particularly, to image brightness detection for digital x-ray imagers.

BACKGROUND ART

Diagnostic x-ray imaging devices when operated in a real time mode (e.g. fluoroscopy) require a system to maintain the x-ray exposure to the detector and the displayed image brightness at optimum levels. Such a system allows the brightness of an image to remain relatively constant despite the fact that the density and thickness of the tissues being imaged are varying. This system requires a brightness detector which senses the signal level in the image and uses this information to control the x-ray exposure and displayed brightness.

Conventional x-ray imaging systems based on image intensifier and video camera perform brightness detection either through use of a small area photosensor at the output of the image intensifier or through use of the analog video signal from the camera. The information from the brightness detector is fed back to the x-ray generator to adjust the x-ray tube voltage and current. Adjustment of x-ray tube voltage and current controls the x-ray exposure to the imager and normally maintains fairly constant brightness. To maintain the optimum brightness in circumstances where the desired exposure cannot be attained, however, a separate signal-level control, independent of the exposure, is required. In conventional systems, this additional control is provided by adjusting an aperture in the image gate and/or by changing the gain of the video camera.

Large area solid state detectors are currently being developed in the x-ray art. In these detectors, conventional analog brightness detection methods are not applicable. Unlike an image intensifier, there exists no minified light image in such a detector. Therefore, methods which employ a small area photosensor cannot be directly adapted. Either a large area sensor or a means of concentrating light from a large area into a small area would be required. Neither of these approaches is attractive from the standpoint of packaging and cost. Also, for a large area solid state imager, an analog signal equivalent to the video signal in an image intensifier/video camera system is not easily accessible. Instead, the easily-available signals are in digital form.

Since conventional brightness detection methods are inappropriate for a fully digital detector, it would be desirable to have a digital brightness detector with increased flexibility and additional features compared to conventional approaches. Such a detector would be beneficial in any system, including image-intensifier-based systems, in which the image is available in digital form.

SUMMARY OF THE INVENTION

The present invention solves the problem of performing brightness detection in a diagnostic x-ray imaging system employing a large area solid state x-ray detector. In addition, the digital method used has increased flexibility and opportunity for additional features compared to conventional methods. These benefits make it useful in any system in which the x-ray image exists in digital form.

In accordance with one aspect of the present invention, a brightness detector is used to control the x-ray exposure and the displayed image level in a diagnostic x-ray imaging system. Initially, a region of interest of an image is specified. The average pixel value within the specified region of interest of the image is then found, taking into account regions of high brightness in the calculation and ignoring regions below a preselected low signal level threshold. Finally, the average pixel value is fed back to the x-ray generator to control the x-ray exposure. The average pixel value is also used to determine a scaling factor. This factor is applied to the image in order to maintain an optimum brightness level in situations where the desired exposure cannot be attained.

Accordingly, it is an object of the present invention to provide an automatic brightness detector for a digital x-ray imager. Other objects and advantages of the invention will be apparent from the following description, the accompanying drawings and the appended claims.

DETAILED DESCRIPTION OF THE PREFERRED EMBODIMENTS

A digital brightness detector, which provides all of the features available with conventional approaches, is necessary for use in x-ray diagnostic imaging systems using large area solid state x-ray detectors. The present invention solves the problem of performing brightness detection in a diagnostic x-ray imaging system employing a large area solid state x-ray detector. In addition, the digital method used has increased flexibility and opportunity for additional features compared to conventional methods. These benefits make it useful in any system in which the x-ray image exists in digital form.

The present invention discloses a method using the digital data from the detector to perform the brightness function. A difficulty with the digital approach is that one must determine an average brightness signal from millions of pixel values in a time period of only a few msec. Any viable approach, must therefore perform the required computations very rapidly, and with a reasonable cost and complexity.

The digital brightness detector must also provide all the features obtained with conventional approaches. Such features include a roll off of response at high signal levels and a process to discard low level signals. The reduced response at large signal levels reduces the effect of high brightness areas in the calculation of the average brightness level of the image. A process to discard low level signals is needed so that objects such as a lead glove or a collimator blade, which are not considered part of the image whose brightness is being controlled, do not affect the average brightness calculation.

A fully digital approach provides increased flexibility and opportunities for additional features compared to conventional systems. For example, the area of the image used for the calculation of average brightness can be defined much more precisely with digital methods. This area can have well-defined size and shape and may even consist of multiple unconnected regions. Additionally, the digital approach provides the capability of weighting different areas within the region of interest differently. This feature allows the digital brightness detector to emulate the "fuzzy edges" which are present on analog photosensors, but control of this weighting can be more precise in the digital system. By carefully designing the weighting, instabilities in the brightness signal caused when the boundary of the brightness detector region of interest crosses regions of different tissue thickness or density can be minimized.

Figure 1:
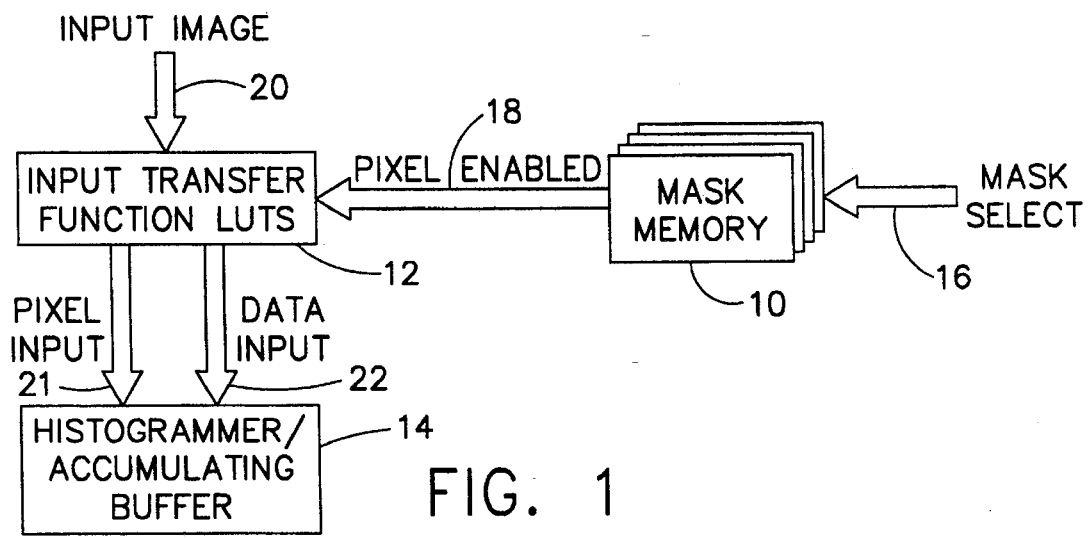
FIG. 1 is a functional block diagram of a digital brightness detector according to the present invention.

A block diagram showing a particular embodiment of the invention is shown in FIG. 1. FIG. 1 shows three main blocks 10, 12, 14 which perform the functions of controlling the region of interest, gamma and threshold, and real-time computation of the average pixel value.

Both the size and position of the brightness region of interest (ROI) and the specific weighting of different parts of the ROI are controlled through use of the 1-bit mask memory 10, which receives a mask select via input 16. The mask defines which pixels within the image will be used in calculating the average. If a pixel of the mask is "enabled", as indicated by the output 18 of mask memory 10, the pixel corresponding to the same position in the original image, via input 20, is used in calculating the average brightness value. The enabled pixels of the input image are mapped through the input transfer function lookup tables 12, and routed to the pixel input 21 and data input 22 buses of the histogrammer accumulating buffer 14. The mask does not necessarily require the same spatial resolution as the image to be analyzed. Therefore, it may be defined with coarser resolution. In this case, each pixel in the mask will correspond to a block of pixels in the original image. Such an implementation reduces memory requirements of the mask.

Figure 2:
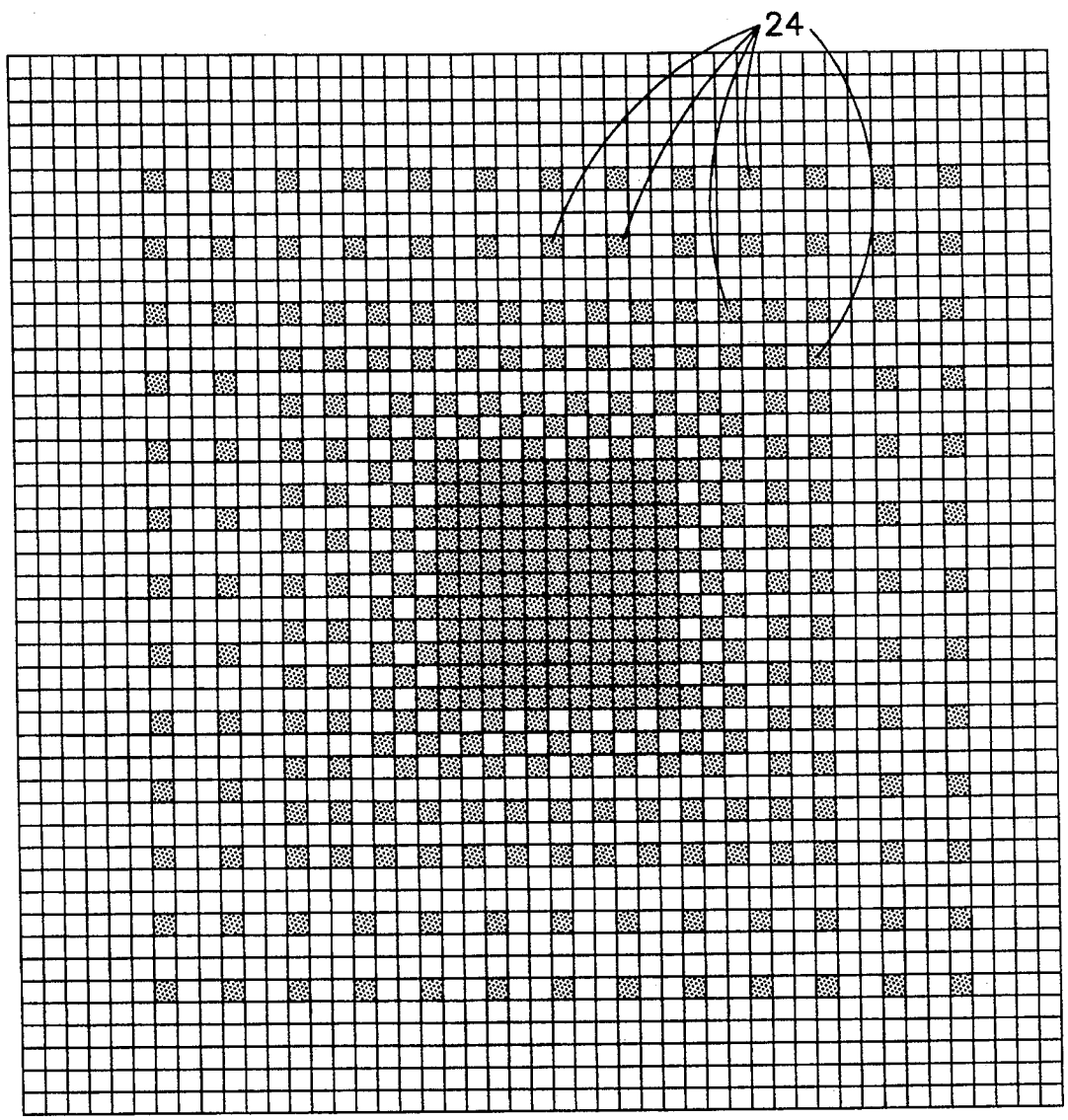
FIG. 2 illustrates a diagram of a mask memory defining which pixels within an image will be used in calculating the average brightness.

One can define a region of interest in which different parts of the image are weighted differently by means of a "half-toning" algorithm. That is, a greater density of pixels is used in regions of the image that are to be weighted more heavily and a lower density of pixels is used in regions that are to be weighted less heavily. This is illustrated schematically in FIG. 2. In this example, the density of enabled pixels 24 is greater in the center than the edges, so the average brightness depends more on the brightness at the center of the image than on the brightness at the edges. Because different types of imaging require differently placed and sized ROI's, FIG. 1 illustrates that several different mask memories may be contained in the hardware. The appropriate mask memory may be chosen based upon the imaging procedure.

A transfer function implemented by using a lookup table causes the roll-off of response at high signal levels and discards low level signals. The use of the lookup table to perform these functions is described in the detailed implementation discussed below.

The computation of average brightness must be performed on every frame, typically at 30 frames per second, and must be completed in time for the result to be applied to the next frame. Typically the time available between frames for the computation is only a few msec. The required computation is performed using a histogrammer/accumulating buffer device.

The histogrammer/accumulating buffer is used to compute two numbers: a weighted sum of pixel values within the brightness detection ROI and above a low signal level threshold, and the total number of pixels outside the ROI or below the threshold. From these two numbers the required weighted average of pixel values within the ROI can be computed. The detailed implementation is described below.

Figure 3A:
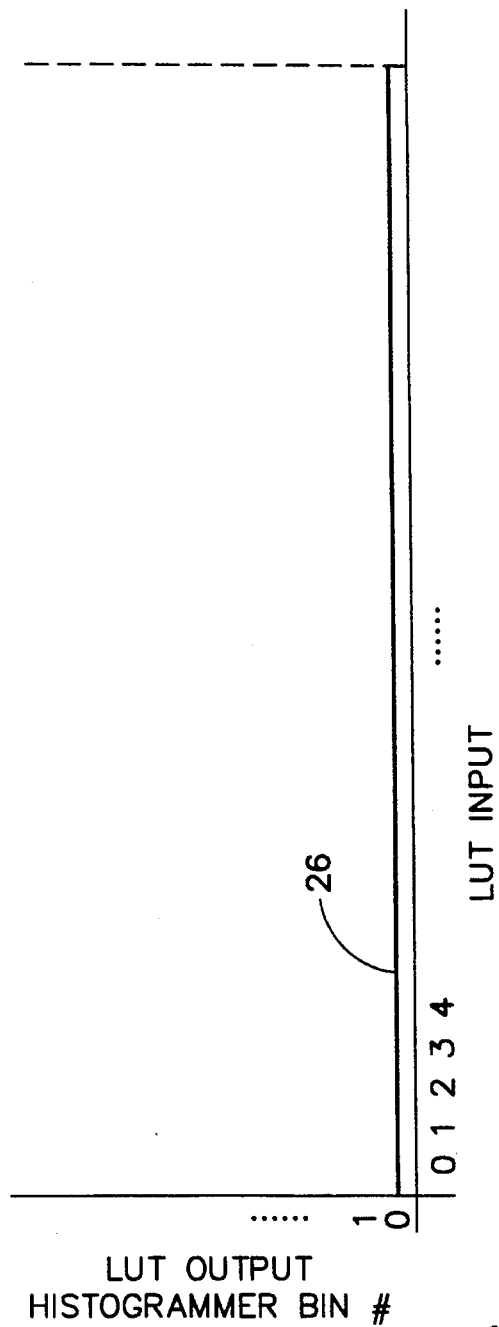
FIGS. 3A, 3B, 4A and 4B are graphical representations of the transfer functions through which an image is mapped for input to the histogrammer/accumulating buffer.
Figure 3B:
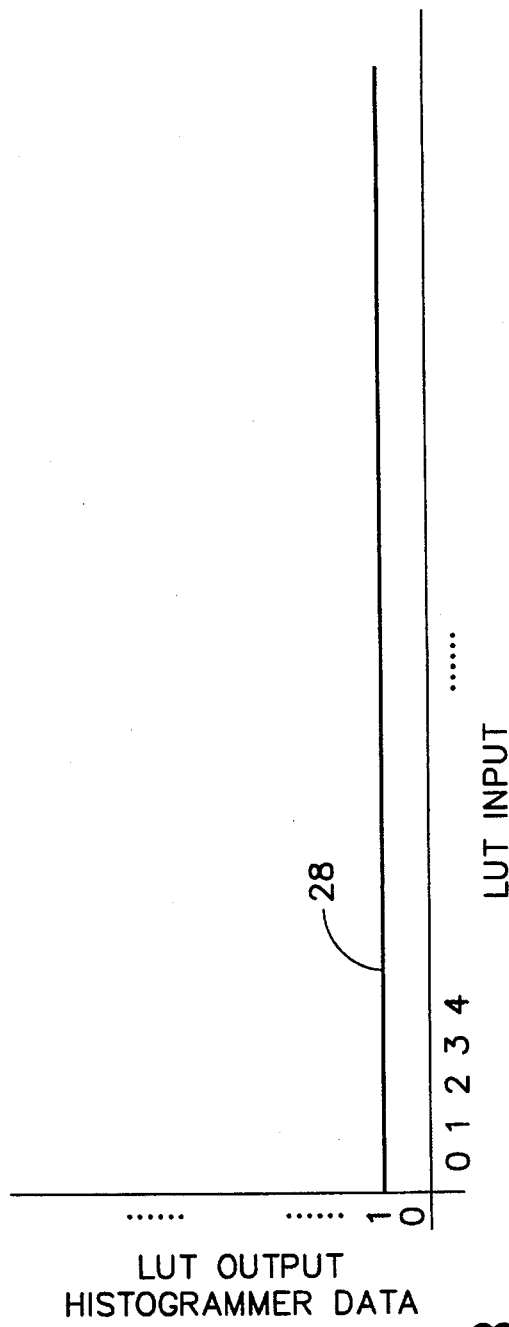

For purposes of the present application, the histogrammer/accumulating buffer is operated in "bin accumulate" mode. In this mode, pixel values from an incoming image 20 are routed through lookup tables 12 to the device on two buses, called the pixel input bus 21 and the data input bus 22. The data on the pixel input bus defines a histogram bin number into which data on the data input bus is added. Pixels within the brightness detection ROI, as defined by the mask, called enabled pixels, are treated differently from pixels outside the ROI, called not-enabled pixels. The pixel value of a not-enabled pixel is mapped through the transfer function 26 shown in FIG. 3A to the pixel input bus, and through the transfer function 28 shown in Fig. 3B to the data input bus. The transfer function in FIG. 3A maps every input pixel value to 0, while the transfer function in FIG. 3B maps every pixel value to 1. The result, then, is that bin 0 is incremented by 1 for each pixel which is not enabled.

Figure 4A:
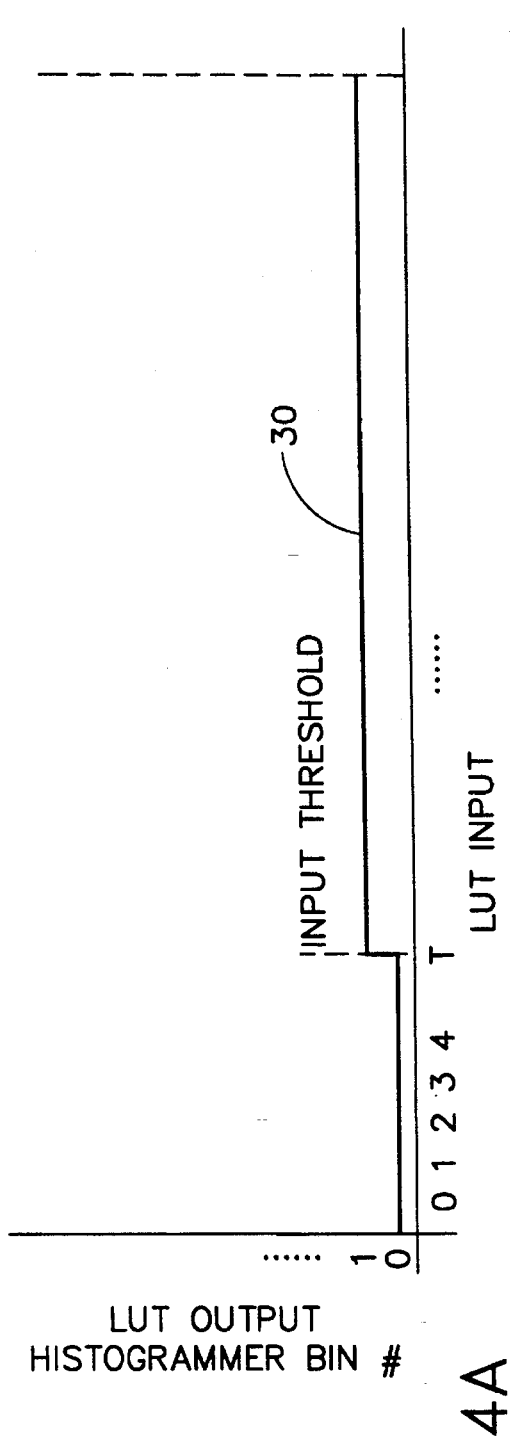
Figure 4B:
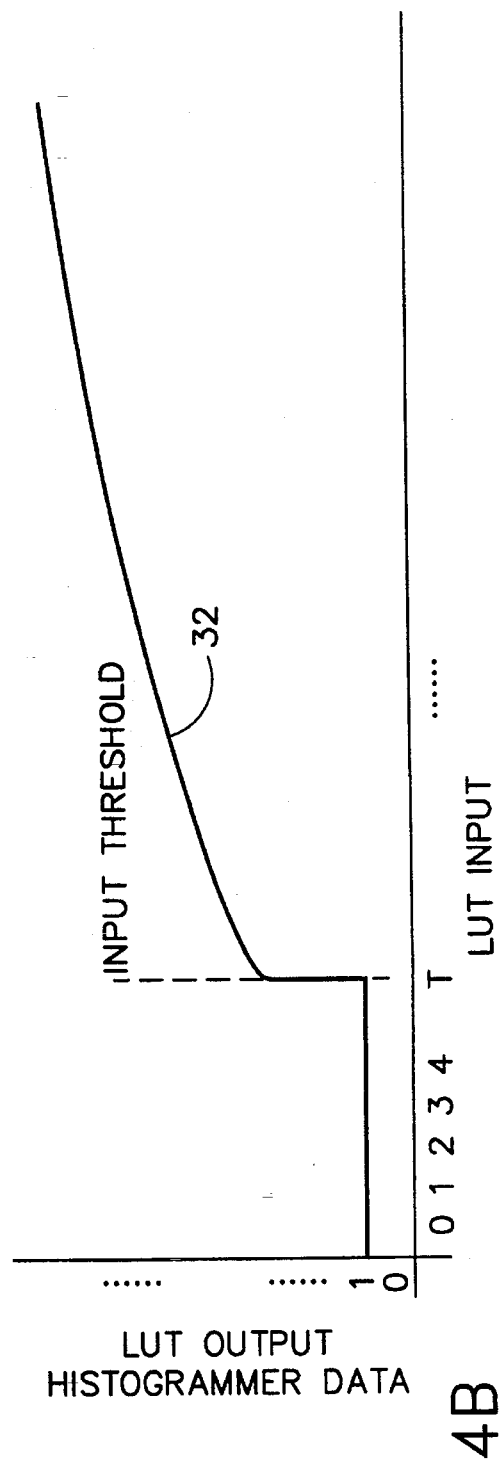

For enabled pixels, the corresponding transfer functions 30 and 32 for the pixel input bus and the data input bus are shown in FIGS. 4A and 4B, respectively. These transfer functions 30 and 32 are used to implement the low signal level threshold and the roll-off of response at large signal levels. For pixels below a threshold, T, the transfer functions 30 and 32 are identical to those for pixels not enabled, and the action is the same: bin 0 of the histogram is incremented by 1 for each enabled pixel whose value is below the threshold. For pixels with values equal to or above the threshold, FIG. 4A shows that bin 1, rather than bin 0, is updated. The number added to this bin depends on the incoming pixel value, as shown in FIG. 4B. The function mapping input pixel value to histogrammer data value increases with pixel value. The maximum histogrammer data value may be suitably limited to prevent overflow of the histogrammer accumulator. The transfer function may be linear, linear with a cutoff above a specific input level, or non-linear, depending on the desired properties of the average that one is computing. For example, the curve shown has a smaller slope for larger incoming pixel values. The effect of this is to roll off response at large signal levels, i.e., brighter areas of the image will contribute a smaller fraction of their signal to the average than darker areas.

Figure 5:
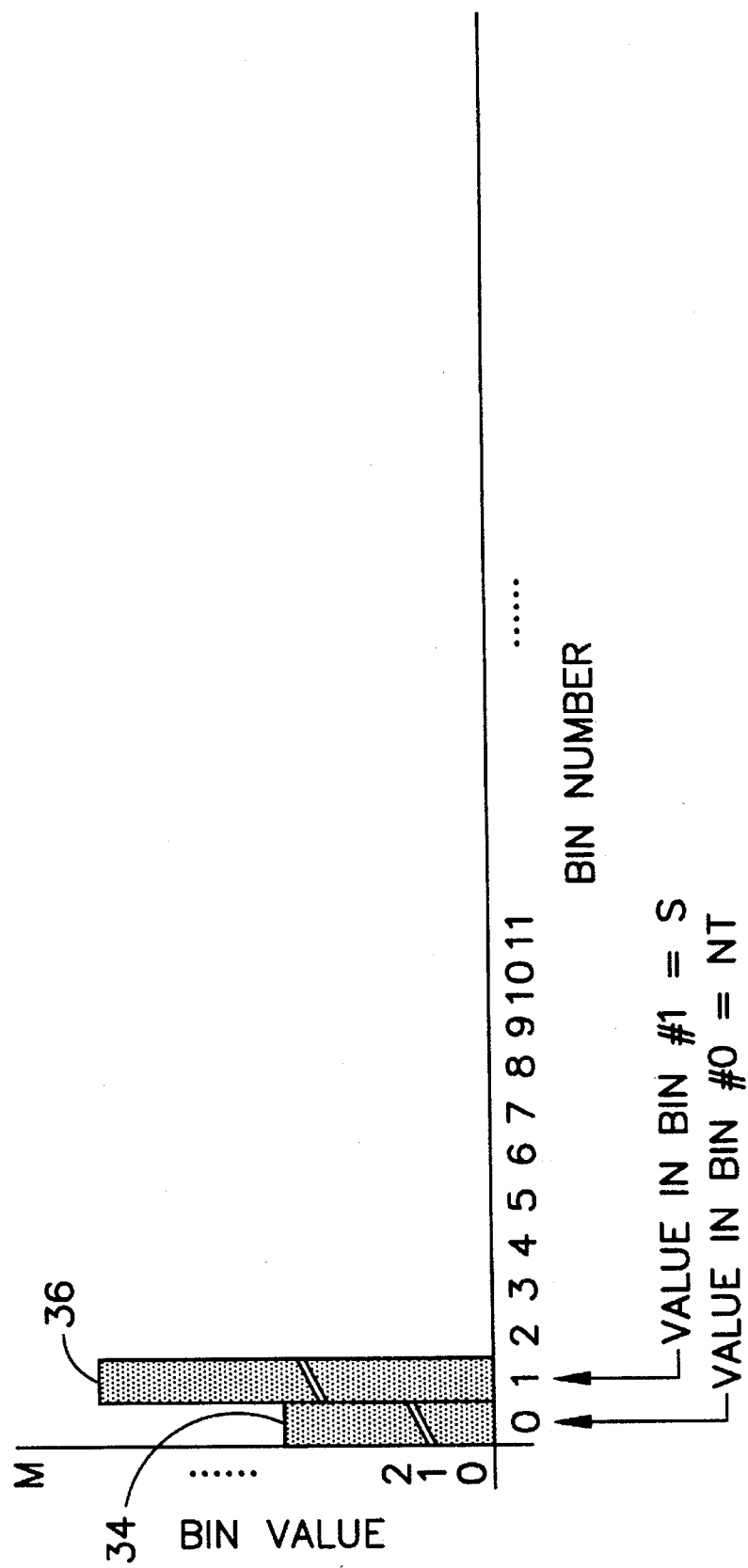
FIG. 5 is a graphical representation of the result obtained in the histogrammer/accumulating buffer after the brightness detection operation.

After all the pixels of an image have been processed as described above, the histogrammer /accumulating buffer will contain values in two bins, bin 0 and bin 1, as shown in FIG. 5. The value NT, referenced as number 34, in bin 0 is the number of pixels outside the brightness detection ROI plus the number of pixels inside the ROI whose values fall below the threshold. The value S, referenced as number 36, in bin 1, is a weighted sum of the values of pixels inside the ROI and equal to or above the threshold. The total number of pixels contributing to this sum is the total number of pixels in the image, N, minus NT, the value contained in bin 0. The brightness signal is thus defined to be Average Brightness $= S/(N-NT)$.

This value is fed back to the x-ray generator to control x-ray exposure. It is also used to update a digital scaling factor, which maintains constant brightness in situations where the desired x-ray exposure cannot be attained.

The invention has been described in detail with particular reference to certain preferred embodiments thereof, but it will be understood that modifications and variations can be effected within the spirit and scope of the invention.

We claim:

1. A method of performing brightness detection for a digital x-ray detector comprising the steps of:

specifying a region of interest of an image;

finding the average pixel value within the specified region of interest of the image;

providing the result of the average pixel value finding to the x-ray generator for control of the x-ray exposure; and using the average pixel value to update a digital scaling factor.

2. A method of performing brightness detection as claimed in claim 1 wherein the step of calculating the average pixel value within the specified region of interest of the image further comprises the step of ignoring regions below a preselected low signal level threshold.

3. A method of performing brightness detection as claimed in claim 1 wherein the step of finding the average pixel value within the specified region of interest of the image further comprises the step of calculating the average pixel value with a lesser weighting of pixels with high signal levels to pixels with low signal levels.

4. A method of performing brightness detection as claimed in claim 1 wherein the step of finding the average pixel value within the specified region of interest of the image further comprises the step of using a histogrammer/accumulating buffer device to compute the average pixel value.

5. A method of performing brightness detection as claimed in claim 4 wherein the step of using a histogrammer/accumulating buffer device to compute the average pixel value further comprises the steps of:

computing a weighted sum of pixel values within the region of interest and equal to or above a low signal level threshold; and computing a total number of pixels outside the region of interest or below the low signal level threshold.

6. A method of performing automatic brightness detection as claimed in claim 5 wherein the histogrammer/accumulating buffer is operated in a bin accumulate mode.

7. A method of performing automatic brightness detection as claimed in claim 1 wherein the step of specifying a region of interest comprises the step of using a mask memory containing a map of pixels to be included in the region of interest.

8. A method of performing automatic brightness detection as claimed in claim 7 further comprising the step of weighting different areas of the image differently when computing the average.

9. A method of performing automatic brightness detection as claimed in claim 8 wherein the step of weighting different areas of the image differently further comprises the step of including a greater density of pixels within the mask for regions that are to be weighted more heavily and a smaller density of pixels for regions that are to be weighted less heavily.

10. A method of performing automatic brightness detection as claimed in claim 1 wherein the region of interest comprises multiple disconnected areas.

* * * * *